(12) United States Patent
Tai et al.

(10) Patent No.: US 6,669,460 B1
(45) Date of Patent: Dec. 30, 2003

(54) LENS MOLD CARRIER

(75) Inventors: Kok-Ming Tai, Lawrenceville, GA (US); Kevin James Kastner, Clarkesville, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/491,329

(22) Filed: Jan. 26, 2000

Related U.S. Application Data

(60) Provisional application No. 60/183,060, filed on Feb. 5, 1999.

(51) Int. Cl.$^7$ .............................................. B29D 11/00
(52) U.S. Cl. ....................... 425/193; 425/808; 249/120; 249/155
(58) Field of Search ................................ 425/193, 808; 249/117, 119, 120, 137, 155; 264/1.1, 2.5

(56) References Cited

U.S. PATENT DOCUMENTS

| | | | | |
|---|---|---|---|---|
| 4,402,659 A | * | 9/1983 | Greenbaum | 425/233 |
| 4,842,506 A | * | 6/1989 | Coutier | 425/193 |
| 5,733,585 A | * | 3/1998 | Vandewinckel et al. | 425/192 R |
| 5,916,494 A | * | 6/1999 | Widman et al. | 264/1.1 |
| 6,197,227 B1 | * | 3/2001 | Appleton et al. | 264/1.1 |

FOREIGN PATENT DOCUMENTS

EP    0227 365 B1    2/1992

OTHER PUBLICATIONS

International Search Report for PCT/EP00/00871.

* cited by examiner

*Primary Examiner*—James P. Mackey
*Assistant Examiner*—Donald Heckenberg
(74) *Attorney, Agent, or Firm*—Richard I. Gearhart; Rob J. Gorman; R. Scott Meece

(57) ABSTRACT

A carrier is provided for holding a lens mold that includes a first mold half defining a first optical surface and a second mold half defining a second optical surface. A first frame defines a front surface. A holder assembly is in operative communication with the first frame and is configured to receive the first mold half. The holder assembly is adjustable to rotationally secure the first mold half so that the first optical surface faces outward from the first frame front surface and in any of a plurality of rotational positions with respect to an axis normal to the first frame front surface. A second frame is configured to receive the second mold half so that the second optical surface faces outward from a front surface of the second frame. The second frame front surface opposes the first frame front surface upon alignment of the first frame and the second frame in an operative position.

27 Claims, 4 Drawing Sheets

LENS MOLD CARRIER

This application claims priority of provisional application No. 60/183,060, having a priority date of Feb. 5, 1999; which was converted to a provisional application by petition filed on Jan. 26, 2000, based on non-provisional application Ser. No. 09/244,967, filed Feb. 5, 1999.

BACKGROUND OF THE INVENTION

The present invention relates to cast molding of toric contact lenses, which include an optical zone providing a cylindrical correction for patients having certain astigmatic abnormalities. Unlike contact lenses having only a spherical correction, which may generally be placed on the eye in any rotational position, toric lenses are positioned on the patient's eye such that the optical zone's toric axis is aligned with the eye's astigmatic axis.

To maintain a toric contact lens in position, it is well known to provide structure on the contact lens to orient the lens through the operation of gravity and/or eyelid movement. For example, the lens may be thinned and/or thickened, for example to provide ballast or slab-off, at various areas so that the eyelid's movement during blinking moves the lens to the correct position. The particular design of this structure is not in and of itself critical to the present invention and is therefore not discussed in greater detail herein. For ease of discussion, all such structure, including slab-off, is generally referred to herein as "ballast." Because the ballast maintains the toric contact lens at a predetermined orientation on the eye, the toric optical zone is formed so that the toric axis is offset from the ballast orientation to align the toric axis with the patient's astigmatic axis. This offset is often defined in increments, for example of 5° or 10°.

Ballast is typically defined by the outer contact lens curve to prevent discomfort to the eye and to take advantage of eyelid movement. The toric optical zone may be defined on either the front or back lens curve. Depending on the method used to manufacture the lens, however, it may be desirable to define the toric surface on the back curve.

Where the lens is formed by a cast molding process, a monomer is typically deposited in a cavity between two mold halves that are themselves formed by injection molding. Each mold half defines an optical surface that forms either the front lens curve or the back lens curve. These optical surfaces are, in turn, formed by optical tools disposed in the mold cavity of an injection molding machine. Optical tools used to make toric lens molds therefore define the toric optical zone and ballast that are imparted to the mold halves. If the ballast and the toric optical zones are formed on the same lens surface, the optical tool forming that surface would define both characteristics. Thus, for given ballast and toric zone designs, a separate optical tool is required for every offset angle. To reduce the number of required optical tools, the ballast and the toric zone may therefore be defined on opposite contact lens surfaces, and therefore on opposite lens mold halves. For instance, the ballast may be defined by the front curve mold half while the toric optical zone is defined by the back curve mold half. Accordingly, the resulting mold halves may be rotated with respect to each other to achieve a desired offset angle.

Once the mold halves are formed, the lens-forming process using the mold may be automated to varying degrees. The present invention is directed to an improved apparatus for holding the mold halves during such a process and rotating the halves with respect to each other to achieve a desired rotational offset between them.

SUMMARY OF THE INVENTION

The present invention recognizes and addresses disadvantages of prior art constructions and methods.

Accordingly, it is an object of the present invention to provide an improved lens mold carrier.

This and other objects are achieved by a carrier according to the present invention for holding a lens mold. The lens mold includes a first mold half defining a first optical surface and a second mold half defining a second optical surface. The first mold half and the second mold half are configured to receive each other so that a lens forming cavity is defined between the first optical surface and the second optical surface. The carrier includes a first frame defining a front surface. A holder assembly is in operative communication with the first frame and is configured to receive the first mold half. The holder assembly is adjustable to rotationally secure the first mold half so that the first optical surface faces outward from the first frame front surface and in any of a plurality of rotational positions with respect to an axis normal to the first frame front surface. A second frame is configured to receive the second mold half so that the second optical surface faces outward from a front surface of the second frame. The second frame front surface opposes the first frame front surface upon alignment of the first frame and the second frame in an operative position.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
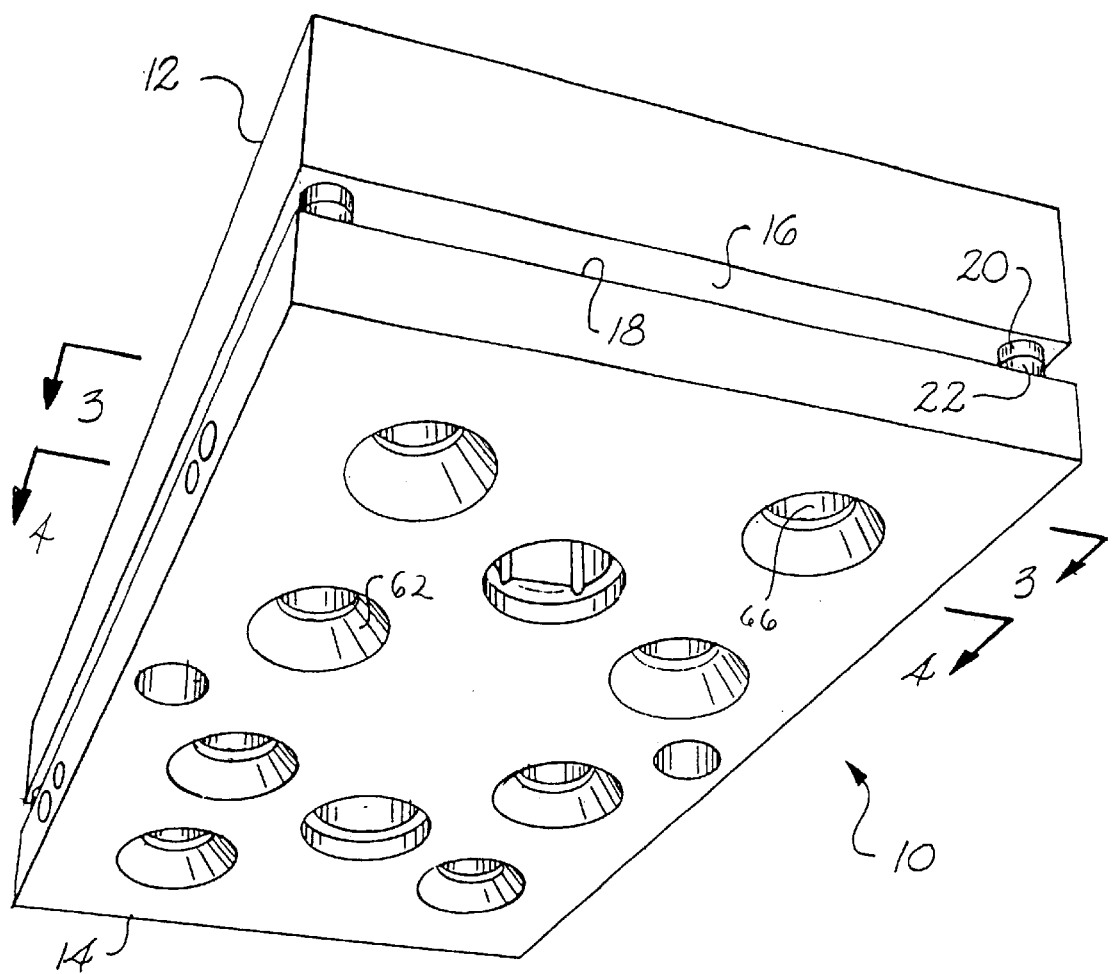
FIG. 1 is a perspective view of a lens mold carrier constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a lens mold carrier 10 includes a first frame 12 and a second frame 14. First frame 12 and second frame 14 define respective front surfaces 16 and 18 that oppose each other in the operative position of carrier 10 illustrated in FIG. 1. Surfaces 16 and 18 are substantially planar. That is, despite the presence of holes in the surfaces, the surfaces are otherwise flat. Minor variations may be provided in the surfaces in this embodiment as long as they do not prevent placement of the plates in the operative position. Four pairs of opposing rest buttons 20 and 22 are disposed at the corners of frames 12 and 14 to maintain a predetermined distance between the frames in the operative position.

As illustrated in the figures and discussed herein, frames 12 and 14 comprise solid plates having cavities therein to house other components. It should be understood, however, that this is for illustrative purposes only and that other suitable frame constructions may be employed within the present invention. For example, frames may be relatively open structures with open front surfaces. Clips, rings or other structures may be provided within the frames to hold the other components in position. Further, the front surfaces need not be substantially planer as shown in the present figures. They may be constructed in any suitable manner so that the mold halves may be properly oriented.

Frames 12 and 14 may be held and transported within an automated process for manufacturing contact lenses. During the lens molding step, the frames are moved to the operative position shown in FIGS. 1, 3 and 4. This movement is relative. That is, the frames are moved together relative to each other. With respect to a machine holding and transporting the frames, however, one frame may be held stationary while the other is moved. It should be understood that this nevertheless defines relative movement between the frames.

Figure 2:
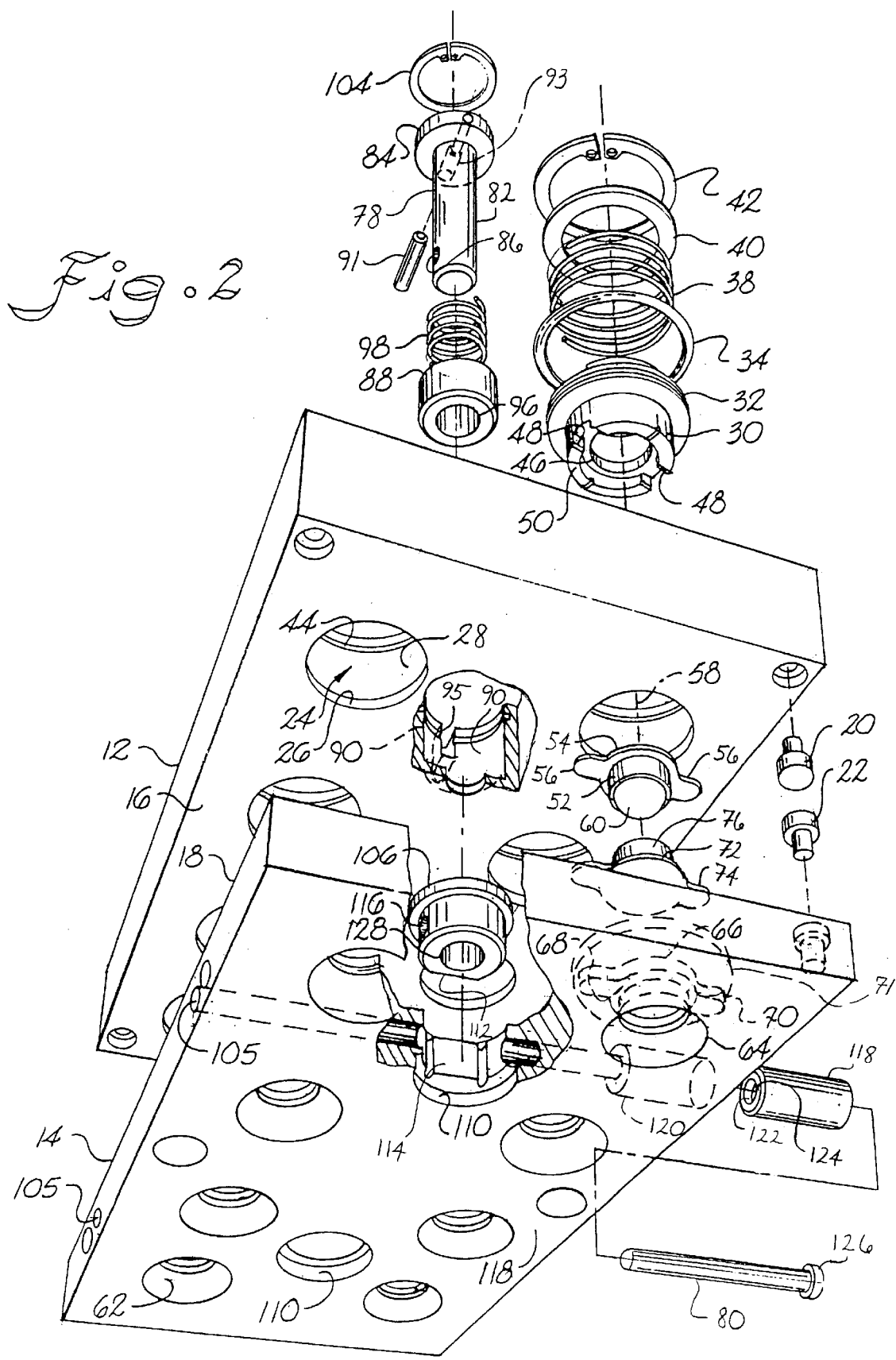
FIG. 2 is an exploded view of the carrier shown in FIG. 1.

Referring to FIG. 2, first frame 12 defines eight holes 24 extending through the plate and opening to front surface 16. An annular shoulder 26 extends radially inward from the inner circumferential surface 28 of each hole 24. In this embodiment, annular shoulder 26 is adjacent front surface 16 so that the front surface includes one side of the shoulder. It should be understood, however, that the shoulder may be disposed further within the hole as appropriate for other suitable constructions. In addition, while annular shoulder 26 extends continuously about hole 24, it should be understood that the shoulder may be defined by discontinuous sections.

Figure 6:
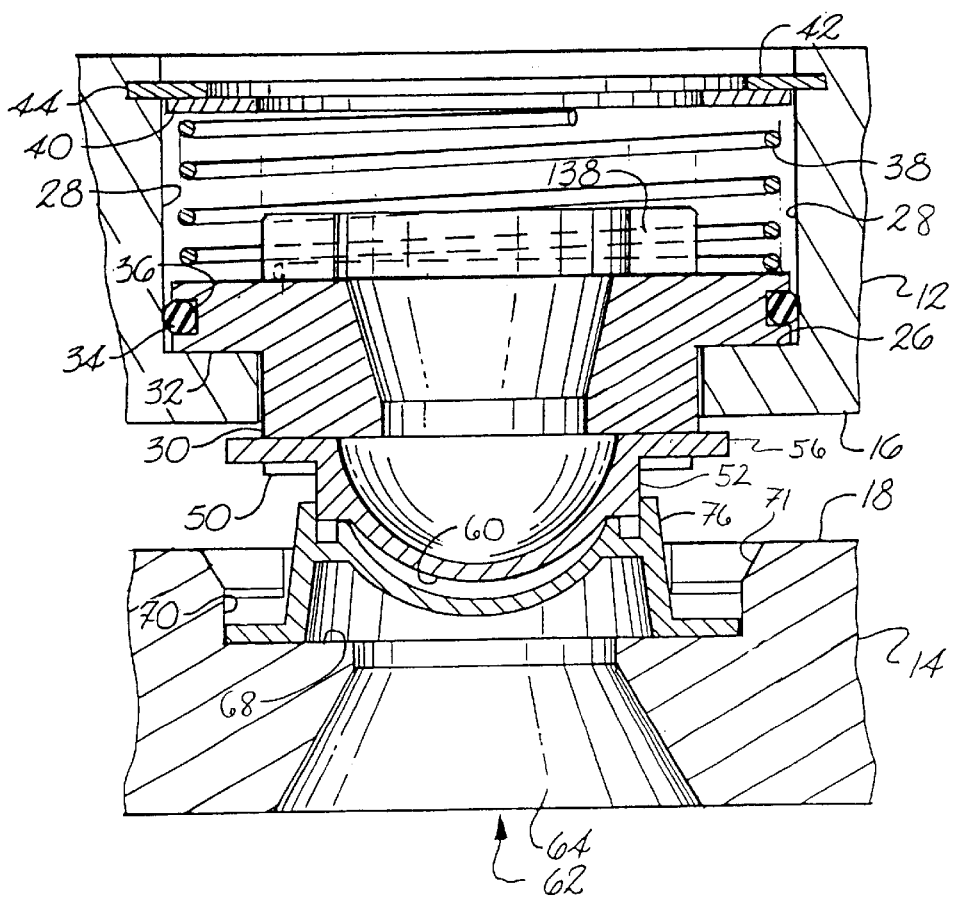
FIG. 6 is a partial cross-sectional view of a lens mold carrier in accordance with an embodiment of the present invention.

Each hole 24 receives a holder assembly including a generally cylindrical holding member 30 having an annular shoulder 32 at the base thereof. Referring also to FIG. 6, an O-ring 34 is received within a channel 36 of shoulder 32. A coil spring 38 bears on one side against holding member 30 and on the opposite side against a washer 40. Washer 40 sits on lock ring 42 received in an annular groove 44 defined in surface 28. Because lock ring 42 is axially secured to plate 12 with respect to the axis of hole 24, spring 38 bears on frame 12 to bias holding member 30 toward front surface 16 so that shoulder 32 engages shoulder 26. In the illustrated embodiment, shoulder 32 abuts the opposing surface of shoulder 26. It should be understood, however, that the holding member may engage shoulder 26 through another component, for example an annular flange surrounding a lens mold half. In a preferred embodiment, holding member 30 and plate 12 are constructed from steel, and spring 38 is a coil spring of sufficient length so that between about 10 and about 15 pounds of pressure is applied to the holding member.

Holding member 30 also defines a recess 46 defining a circular central portion and two outer channels 48 extending through a rim 50. Recess 46 receives a lens mold half 52 defining an annular flange 54 and tabs 56 extending therefrom. Tabs 56 of the lens mold half 52 are received in outer channels 48 (with approximately 0.003 inches clearance in one preferred embodiment) so that mold half 52 is held in and rotatable with holding member 30 with respect to an axis 58 of hole 24.

In the figures, frame 12 is shown as the top frame. Holding member 30 holds base curve mold half 52, which defines a convex optical surface 60. It should be understood, however, that the position of the frames may be reversed and that, moreover, holding member 30 may be used to secure either the front mold half or the base curve mold half.

Referring again to FIGS. 1, 2 and 6, second frame 14 includes a plurality of holes 62 disposed in an arrangement corresponding to the disposition of holes 24 in first plate 12 so that when frames 12 and 14 are aligned in the operative position shown in FIG. 1, the corresponding mold halves of each lens mold oppose each other. Each hole 62 includes a cylindrical portion 66 and a frustoconical counterbore portion 64, thereby forming an annular shoulder 68. Cylindrical portion 66 opens into side slots 70 which, along with cylindrical portion 66, open to front surface 18 through a frustoconical bore section 71. Cylindrical section 66 and tabs 70 are shaped to receive an annular flange 72 and tabs 74 of a second mold half 76 so that mold half 76 is rotationally fixed within hole 62 with respect to axis 58. That is, mold half 76 does not rotate about axis 58 with respect to frame 14.

Referring to FIG. 2, a latch mechanism to hold frame 12 and frame 14 in the operative position shown in FIG. 1 includes a king pin 78 and a lock pin 80. King pin 78 includes an elongated shaft portion 82 and a cylindrical cap 84 at one end of the shaft. A transverse hole 86 extends through the shaft end opposite the cap.

Figure 4:
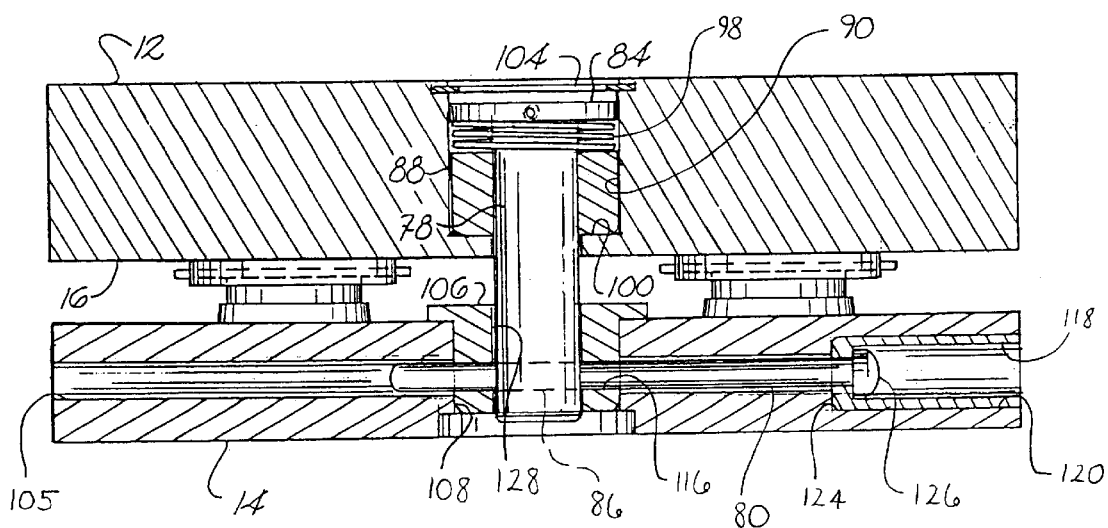
FIG. 4 is a cross-sectional view taken along the line 4—4 shown in FIG. 1.

A bushing 88 is press fit in a hole 90 in plate 12. A bore 96 receives the shaft portion of king pin 78. To rotationally secure king pin 78 with respect to frame 12, and therefore with respect to frame 14 when the frames are in the operative position shown in FIG. 1, a pin 91 is received in a counterbore 93 in cap 84 so that pin 91 extends radially from the cap and is received in a slot 95 extending radially outward from hole 90. Referring also to FIG. 4, a spring 98 bears on one side against bushing 88 and on the opposite side against cap 84. Bushing 88 abuts a shoulder 100 formed by a counterbore formed in hole 90. Thus, spring 98 biases king pin 78 away from frame 14 and lock pin 80. A lock ring 104 retains king pin 78 within frame 12.

Lock pin 80 is received in a bore 105 extending through the width of frame 14. A bushing 106 is press fit in a bore 108 extending through frame 14 and intersecting bore 105. Bushing 106 includes a flat side 112 that mates with an opposing flat 114 in bore 110 to rotationally align the bushing. Bushing 106 includes a through hole 116 that is slightly larger than the diameter of lock pin 80 and that aligns with bore 105 and an axial bore 128 that aligns with bore 96 of bushing 88 when frames 12 and 14 are in the operative position.

A bushing 118 is press fit in a counterbore portion 120 of bore 105. Bushing 118 defines a hole 122 in an end 124 thereof so that hole 122 axially aligns lock pin 80 in bore 105 and so that an end cap 126 of pin 80 abuts end surface 124 to limit the axial passage of pin 80 in bore 105.

For purpose of clarity, only one latch mechanism and one lens mold half holder assembly are illustrated in FIG. 2. It should be understood, however, that a holder assembly is provided for each hole 24 and that a latch mechanism is received in each of two pair of bores 90 and 110. Accordingly, carrier 10 may be used to simultaneously form eight contact lenses using eight contact lens mold assemblies.

Figure 3:
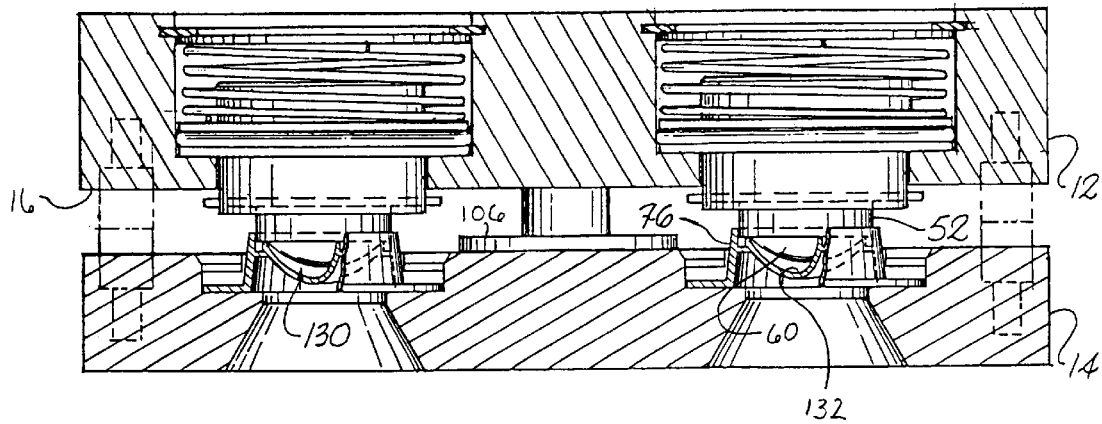
FIG. 3 is a cross-sectional view taken along the line 3—3 shown in FIG. 1.

As noted above, and referring more particularly to FIGS. 3 and 6, frame 12 rotationally secures lens mold half 52 so that its optical surface 60 faces outward from front surface 16. As shown in the illustrated embodiment, mold half 52 is held by holding member 30 slightly outward from front surface 16. As frame 14 is brought toward front surface 16, mold half 76 and mold half 52 engage each other as shown in FIG. 3 to form a lens molding cavity 130 between optical surface 60 and an optical surface 132 of mold half 76. A monomer mixture is deposited in concave surface 132 prior to bringing frames 12 and 14 together, and cavity 130 forms the monomer into the shape of a contact lens.

It should be understood that the mold halves may be placed in various suitable positions in or on the frames as long as the frames may be put together so that the mold halves engage to form the lens cavity. For example, frame 14 may be constructed so that a holding member holds mold half 76 within hole 62 so that optical surface 132 is below front surface 18 with respect to frame 12. Mold half 52 and/or frame 12 is constructed in such an embodiment so that optical surface 60 extends into hole 62 to oppose optical surface 132.

As noted above, front curve mold halves 76 are held in a rotationally fixed position with respect to frames 12 and 14 while the base curve mold halves 52 are rotatable with their respective holding members 30 with respect to the frames. Assuming that the front curve mold halves define the lens ballast and that the base curve mold halves define the toric or multifocal lens characteristics, the holding members 30 may be rotated as needed to achieve a desired offset between the toric or multifocal axis and the ballast in each mold pair.

Initially, all holding members 30 may be aligned in a uniform, predetermined rotational position with respect to frame 12 to receive mold halves 52. This may be desirable in a system in which an automated transfer device removes the mold halves from an injection molding machine and places them directly into the carrier in a certain orientation. A similar transfer device may place front curve mold halves 76 into frame 14. Once the mold halves are in the frames, the system then rotates each mold half 52 to achieve a desired offset between its toric or multifocal axis and the ballast of its opposing front curve mold half.

The present invention may be used within a variety of molding systems. In the present embodiment, only mold halves 52 are rotated as needed to achieve a desired offset between the toric axis and the ballast, and rotatable holder assemblies 30 are therefore provided only in frame 12. It should be understood, however, that frame 14 could also include rotatable holder assemblies so that the front curve molds are rotatable. In such an embodiment, frame 14 would have a construction similar to that of frame 12 with respect to the holder assemblies.

Once the mold halves are properly oriented, frame 14 is moved to a dispensing station at which monomer is injected into the mold half front curves. A suction device is then brought to the bottom of frame 12 and applies suction to holes 24 (FIG. 2) to retain mold halves 52 in frame 12 as the frame is inverted and moved to a position above frame 14. The frame is then placed down onto frame 14 so that the frames may be attached as described in more detail below.

As noted above, mold halves 52 may be rotated prior to assembly of the frames to achieve the desired optical axis/ballast offset. However, the mold halves may instead be rotated after assembly. In either case, the molds may be rotated in a similar manner as will now be described with reference to the embodiment shown in FIGS. 3 and 6.

A frictional engagement between O-ring 34 and surface 28 must be overcome before holding member 30, and therefore mold half 52, rotates with respect to frame 12 about axis 58 (FIG. 2). O-ring 34 is preferably made of a flexible polymer or elastomer, such as a polyamide, polyester or flouropolymer elastomer. Its construction, and the construction of hole 24 and the holder assembly, are chosen such that this threshold rotational force necessary to rotate holding member 30 with respect to frame 12 is greater than rotational forces that may be reasonably expected between the-holding member and frame 12 during movement of carrier 10 after the lens molds are placed in the carrier and during the lens casting process.

Figure 5:
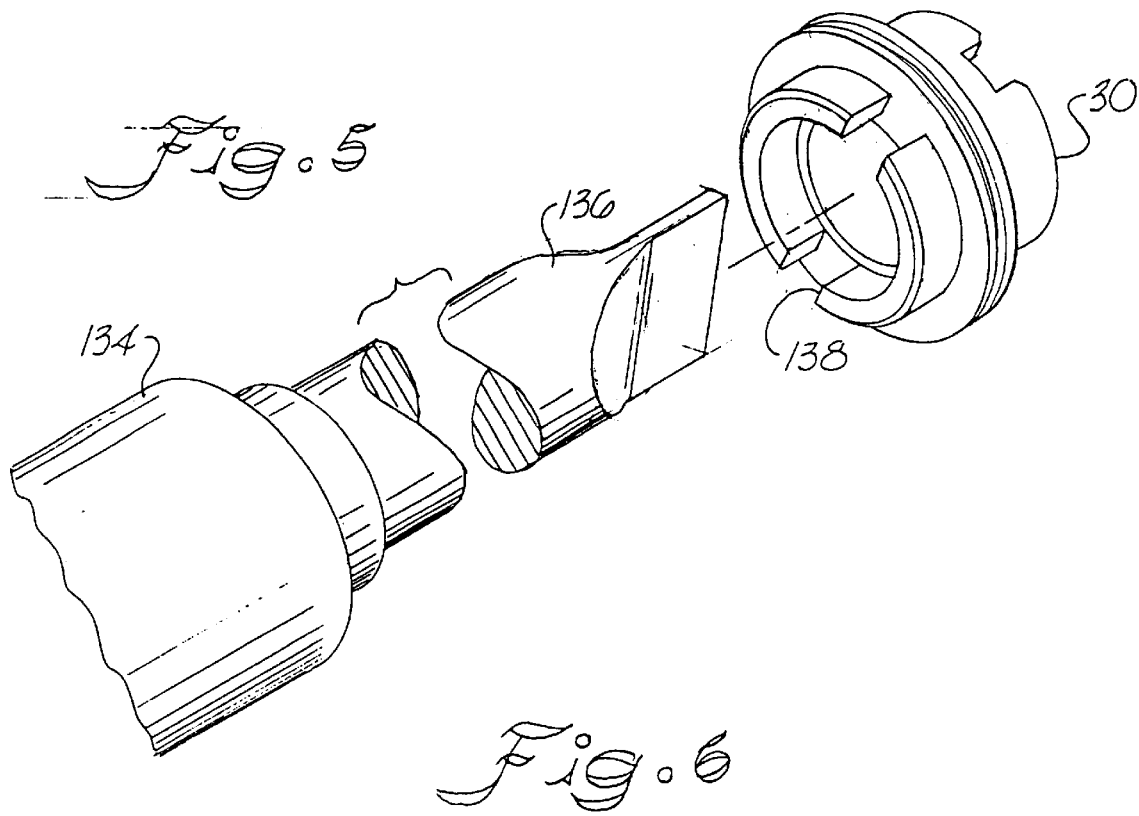
FIG. 5 is a partial perspective view of an adjusting tool for rotating a holder assembly within a lens mold carrier in accordance with an embodiment of the present invention.

The threshold rotational force nevertheless permits rotation of holding member 30 by application of torque to holding member 30 by manual or mechanical means, for example by a tool 134 shown in FIG. 5 that is operated automatically by the cast molding machine. The cast molding machine inserts tool 134 into bore 24 through lock ring 42, washer 40 and spring 38 until a screw driver tip 136 is inserted within a slot 138 in holding member 30. The machine then rotates tool 134 until lens mold half 52 is rotated about axis 58 (FIG. 2) to a desired rotational position with respect to mold half 76. Lens mold half 52 may thus be placed in any of a plurality of rotational positions so that the optical surface 60 cylindrical axis may be offset from the ballast provided by optical surface 132 to the desired degree. The tool is then withdrawn from bore 24.

Referring to FIGS. 3 and 4, prior to the point when frames 12 and 14 are brought together so that the mold halves engage one another to form lens mold cavity 130, king pin 78 and lock pin 80 are not engaged, and spring 98 biases cap 84 upward to engage lock ring 104 so that through hole 86 does not align with bore 105. Lock pin 80 is not inserted in bore 105. Once the frames are brought together in the operative position shown in FIGS. 1 and 3, however, the cast molding machine inserts a tool into bore 90 from the rear side of frame 12, engaging cap 84 and pushing king pin 78 forward against the bias of spring 98 until hole 86 aligns with bore 105. A light and light receiver may be placed at opposite sides of bore 105 to confirm that hole 86 is aligned with the bore. A second tool 184 holds lock pin 80. When the bore and hole are aligned, the machine inserts this tool into the right hand opening of bore 105 to push lock pin 80 to the left until it passes through hole 86 and end cap 126 abuts end surface 124. The first tool is then withdrawn from bore 90, causing spring 98 to push upward against king pin 78, thereby holding lock pin 80 between king pin 78 and bushing 106 as shown in FIG. 4. The second tool is then removed from bore 105. In the operative position of frames 12 and 14, suction is not required to maintain mold halves 52 in frame 12, and is therefore no longer applied.

When the frames are latched together, carrier 10 may be moved as a unit to later processing stages for ultraviolet curing. After a suitable curing period, for example approximately thirty minutes, the assembled frames may be moved to another station or facility for finishing of the cured lenses. To disassemble the frames, a tool is inserted into bore 90 to push king pin 78 downward against the bias of spring 98. This releases the hold on lock pin 80 between king pin 78 and bushing 106. A tool is then inserted into the left hand side of bore 105 and pushes lock pin 80 to the right until it clears hole 86. The tool is then removed from bore 90 so that king pin 78 returns to its initial position. The frames may then be separated so that the cured contact lenses formed in the cavities 130 (FIG. 3) of the eight lens molds carried by carrier 10 may be removed.

During subsequent disassembly of carrier 10, for example for cleaning or repair, it may be desirable to confirm that lock pin 80 has been removed from bore 105. In an automated process, a light source emits light into one side of bore 105. A light detector disposed at the other end of the bore receives this light to ensure that the bore is clear.

While one or more preferred embodiments of the invention have been described above, it should be understood that any and all equivalent realizations of the present invention are included within the scope and spirit thereof. For example, the latching mechanism disposed within the frames may be attached at outer plate surfaces and may comprise any suitable construction and configuration. It should also be understood that mechanisms other than friction may be used to wholly or partially rotationally secure a holding member with respect to a frame. For example, the embodiment illustrated in the figures may be modified so that either of the annular shoulders 26 and 32 defines a series of equally spaced protrusions having curved or otherwise angled surfaces that are received by equally spaced corresponding recesses in the other shoulder. These recesses may have angled surfaces that oppose the angled surfaces of the protrusions. Thus, the threshold force necessary to rotate the holding member is additionally determined by the angle at which these surfaces are disposed. Adjacent recesses, and therefore adjacent protrusions, may be spaced apart from each other in increments, for example of 10°, that correspond to the toric axis offset increments in which the contact lenses are provided. In addition, the holding member may engage the frame stop directly or through another component. For example, the mold half may be disposed between the holding member and a shoulder or other stop so that the holding member engages the shoulder through the mold half annular flange. Thus, the embodiments depicted are presented by way of example only and are not intended as limitations upon the present invention. It should therefore be understood by those of ordinary skill in this art that the present invention is not limited to such embodiments since modifications can be made. Therefore, it is contemplated that any and all such embodiments are included in the present invention as may fall within the literal or equivalent scope of the appended claims.

What is claimed is:

1. A carrier for holding a lens mold having a first mold half defining a first optical surface and a second mold half defining a second optical surface, wherein the first mold half and the second mold half are configured to receive each other so that a lens forming cavity is defined between the first optical surface and the second optical surface, said carrier comprising:

a first frame defining a front surface;

a holder assembly in operative communication with said first frame and configured to receive said first mold half, said holder assembly being adjustable to rotationally secure said first mold half so that said first optical surface faces outward from said first frame front surface and in any of a plurality of rotational positions with respect to an axis normal to said first frame front surface;

a second frame configured to receive said second mold half so that said second optical surface faces outward from a front surface of said second frame, said second frame front surface opposing said first frame front surface upon alignment of said first frame and said second frame in an operative position, in which each said first mold half engages an opposing said second mold half to form said cavity;

wherein said first frame includes a stop and wherein said holder assembly includes a holding member and a biasing member, wherein said biasing member biases said holding member to engage said stop, and wherein said holding member is rotatable with respect to said stop upon application of a relative rotational force between said holding member and said stop greater than a threshold level, said threshold level being greater than relative rotational forces applied between said holding member and said stop during relative movement of said first frame and said second frame to said operative position and during formation of a lens in said lens cavity.

2. The carrier as in claim 1, wherein said stop defines a first annular surface, wherein said holding member defines a second annular surface, and wherein said second annular surface abuts said first annular surface upon engagement of said stop by said holding member biased by said biasing member.

3. A carrier for holding a lens mold having a first mold half defining a first optical surface and a second mold half defining a second optical surface, wherein the first mold half and the second mold half are configured to receive each other so that a lens forming cavity is defined between the first optical surface and the second optical surface, said carrier comprising:

a first frame defining a front surface;

a holder assembly in operative communication with said first frame and configured to receive said first mold half, said holder assembly being adjustable to rotationally secure said first mold half so that said first optical surface faces outward from said first frame front surface and in any of a plurality of rotational positions with respect to an axis normal to said first frame front surface;

a second frame configured to receive said second mold half so that said second optical surface faces outward from a front surface of said second frame, said second frame front surface opposing said first frame front surface upon alignment of said first frame and said second frame in an operative position, in which each said first mold half engages an opposing said second mold half to form said cavity; and a latch mechanism configured to retain said first frame and said second frame in said operative position.

4. The carrier as in claim 3, wherein said latch mechanism includes a first pin housed by one of said first frame and said second frame and a second pin housed by the other of said first frame and said second frame, said first pin and said second pin being configured to releasably interlock with each other.

5. The carrier as in claim 3, wherein said first pin is reciprocally movable with respect to its said frame and said other frame along a path of travel parallel to said axis and extending to said other frame, and wherein said second pin is reciprocally movable with respect to said other frame along a path of travel normal to said axis and intersecting said first pin path of travel.

6. The carrier as in claim 5, wherein one of said first pin and said second pin defines a hole therein aligned with the path of travel of the other of said first pin and said second pin and configured to receive said other pin.

7. The carrier as in claim 6, wherein said one pin is biased away from said other pin.

8. A carrier for holding a lens mold having a first mold half defining a first optical surface and a second mold half defining a second optical surface, wherein the first mold half and the second mold half are configured to receive each other so that a lens forming cavity is defined between the first optical surface and the second optical surface, said carrier comprising:
 a first frame defining a front surface;
 a holder assembly in operative communication with said first frame and configured to receive said first mold half, said holder assembly being adjustable to rotationally secure said first mold half so that said first optical surface faces outward from said first frame front surface and in any of a plurality of rotational positions with respect to an axis normal to said first frame front surface;
 a second frame configured to receive said second mold half so that said second optical surface faces outward from a front surface of said second frame, said second frame front surface opposing said first frame front surface upon alignment of said first frame and said second frame in an operative position, in which each said first mold half engages an opposing said second mold half to form said cavity;
 wherein said first frame and said second frame include respective contact surfaces, said first frame contact surface bearing on said second frame contact surface to separate said first frame and said second frame in said operative position by a predetermined distance.

9. A lens mold carrier system, said system comprising:
 a plurality of lens molds, each said lens mold including
  a first lens mold half defining a first optical surface,
  a second lens mold half defining a second optical surface,
  wherein said first mold half and said second mold half are configured to receive each other so that a lens forming cavity is defined between said first optical surface and said second optical surface;
 a first frame defining a front surface;
 a plurality of holder assemblies in operative communication with said first frame, wherein each said holder assembly is configured to receive a respective said first lens mold half and is adjustable to rotationally secure said first mold half so that said first optical surface faces outward from said first frame front surface and in any of a plurality of rotational positions with respect to an axis normal to said first frame front surface;
 a second frame configured to receive said second mold halves in a pattern corresponding to the disposition of said first mold halves in said first frame and so that said second optical surfaces face outward from a front surface of said second frame, said second frame front surface opposing said first frame front surface upon alignment of said first frame and said second frame in an operative position in which each said first mold half engages an opposing said second mold half to form said cavity;
 wherein said first frame includes a plurality of stops proximate said first frame front surface.

10. The carrier as in claim 9, wherein said first frame includes a substantially planar front plate defining said first frame front surface and wherein said second frame includes a substantially planar rear plate defining said second frame front surface.

11. The carrier as in claim 9, wherein each said holder assembly includes a holding member and a biasing member, wherein said biasing member biases said holding member to engage a respective said stop, and wherein said holding member is rotatable with respect to said stop upon application of a relative rotational force between said holding member and said stop greater than a threshold level, said threshold level being greater than relative rotational forces applied between said holding member and said stop during relative movement of said first plate and said second plate to said operative position and during formation of a lens in said lens cavity.

12. The carrier as in claim 11, wherein said holding member is generally cylindrically shaped.

13. The carrier as in claim 11, wherein said holding member defines a recess configured to receive said first mold half so that said first mold half is rotationally fixed with respect to said holding member.

14. The carrier as in claim 11, wherein said stop defines a first annular surface, said holding member defines a second annular surface, and wherein said second annular surface abuts said first annular surface upon engagement of said stop by said holding member biased by said biasing member.

15. The carrier as in claim 11, wherein said biasing member includes a spring.

16. A lens mold carrier system, said system comprising:
 a plurality of lens molds, each said lens mold including
  a first lens mold half defining a first optical surface,
  a second lens mold half defining a second optical surface,
  wherein said first mold half and said second mold half are configured to receive each other so that a lens forming cavity is defined between said first optical surface and said second optical surface;
 a first frame defining a front surface;
 a plurality of holder assemblies in operative communication with said first frame, wherein each said holder assembly is configured to receive a respective said first lens mold half and is adjustable to rotationally secure said first mold half so that said first optical surface faces outward from said first frame front surface and in any of a plurality of rotational positions with respect to an axis normal to said first frame front surface;
 a second frame configured to receive said second mold halves in a pattern corresponding to the disposition of said first mold halves in said first frame and so that said second optical surfaces face outward from a front surface of said second frame, said second frame front surface opposing said first frame front surface upon alignment of said first frame and said second frame in an operative position in which each said first mold half engages an opposing said second mold half to form said cavity; and
 a latch mechanism configured to retain said first frame and said second frame in said operative position.

17. The carrier as in claim 16, wherein said latch mechanism includes a first pin housed by one of said first frame and said second frame and a second pin housed by the other of said first frame and said second frame, said first pin and said second pin being configured to releasably interlock with each other.

18. The carrier as in claim 17, including a biasing mechanism biasing one of said first pin and said second pin away from the other of said first pin and said second pin.

19. The carrier as in claim 17, wherein said first pin is reciprocally movable with respect to its said frame and said other frame along a path of travel parallel to said axis and extending to said other frame, and wherein said second pin is reciprocally movable with respect to said other frame along a path of travel normal to said axis and intersecting said first pin path of travel.

20. The carrier as in claim 19, wherein one of said first pin and said second pin defines a hole therein aligned with the path of travel of the other of said first pin and said second pin and configured to receive said other pin.

21. The carrier as in claim 20, wherein said first pin is biased away from said second pin.

22. The carrier as in claim 14, wherein said first frame and said second frame include respective contact surfaces, said first frame contact surface bearing on said second frame contact surface to separate said first frame and said second frame in said operative position by a predetermined distance.

23. The carrier as in claim 9, wherein one of said first optical surface and said second optical surface of each said lens mold defines a toric optical zone and the other of said first optical surface and said second optical surface defines lens ballast.

24. A lens mold carrier system, said system comprising:
  a plurality of lens molds, each said lens mold including
    a first lens mold half defining a first optical surface, and
    a second lens mold half defining a second optical surface,
    wherein said first mold half and said second mold half are configured to receive each other so that a lens forming cavity is defined between said first optical surface and said second optical surface, and
    wherein one of said first optical surface and said second optical surface defines a toric optical zone and the other of said first optical surface and said second optical surface defines lens ballast;
  a first plate defining a plurality of holes therein opening to a front surface of said first plate and including, for each said hole, an annular shoulder extending about an inner circumferential surface thereof;
  a plurality of holder assemblies, each said holder assembly including
    a holding member disposed within a respective said first plate hole and receiving a respective said first mold half so that said respective first mold half and said holding member are rotatable together with respect to said first plate about an axis normal to said first plate front surface upon application of a rotational force to said holding member greater than a threshold level, and
    a spring, said spring bearing on one side against said first plate and on the other side against said holding member;
  a second plate defining a plurality of holes therein in a pattern corresponding to the disposition of said first plate holes in said first plate and opening to a front surface of said second plate, each said second plate hole receiving a respective said second mold half so that said respective second mold half is rotationally fixed within said second plate hole with respect to said axis and so that said second optical surface faces outward from said second plate front surface;
  a first pin disposed in one of said first plate and said second plate and being reciprocally movable along a path of travel parallel to said axis within holes defined in said first plate and said second plate;
  a second pin disposed in the other of said first plate and said second plate and being reciprocally movable, within a hole defined in said other plate, along a path of travel normal to said axis and intersecting said first pin path of travel, said first pin defining a hole therein aligned with the path of travel of said second pin and configured to receive said second pin; and
  a pin spring in operative communication with said first pin and biasing said first pin away from said second pin,
  wherein said first plate and said second plate include respective contact surfaces, said first plate contact surface bearing on said second plate contact surface to separate said first plate and said second plate, in an operative position of said first plate and said second plate in which said first plate front surface opposes said second plate front surface, by a predetermined distance so that each said first mold half engages an opposing said second mold half to form said cavity, and
  wherein said threshold level is greater than relative rotational forces applied between said holding member and said annular shoulder during relative movement of said first plate and said second plate to said operative position and during formation of a lens in said lens cavity.

25. The carrier as in claim 24, wherein said holding member is a generally cylindrical member defining a recess in a transverse end thereof, said respective first mold half being received in said recess.

26. The carrier as in claim 25, wherein said respective first mold half has a noncircular outer circumference and wherein said recess has an inner circumferential surface corresponding to said noncircular mold half circumference so that said respective first mold half is rotationally fixed within said recess.

27. A carrier for holding a lens mold including a first mold half defining a first optical surface and a second mold half defining a second optical surface, wherein the first mold half and the second mold half are configured to receive each other so that a lens forming cavity is defined between the first optical surface and the second optical surface, said carrier comprising:
  a first frame defining a front surface;
  means for receiving said first mold half, said receiving means being adjustable to rotationally secure said first mold half so that said first optical surface faces outward from said first frame front surface and in any of a plurality of rotational positions with respect to an axis normal to said first frame front surface;
  a second frame means for receiving said second mold half so that said second optical surface faces outward from a front surface of said second frame, said second frame front surface opposing said first frame front surface upon alignment of said first frame and said second frame in an operative position, in which each said first mold half engages an opposing said second mold half to form said cavity;
  a latch mechanism configured to retain said first frame and said second frame in said operative position.

* * * * *